Patented Jan. 1, 1924.

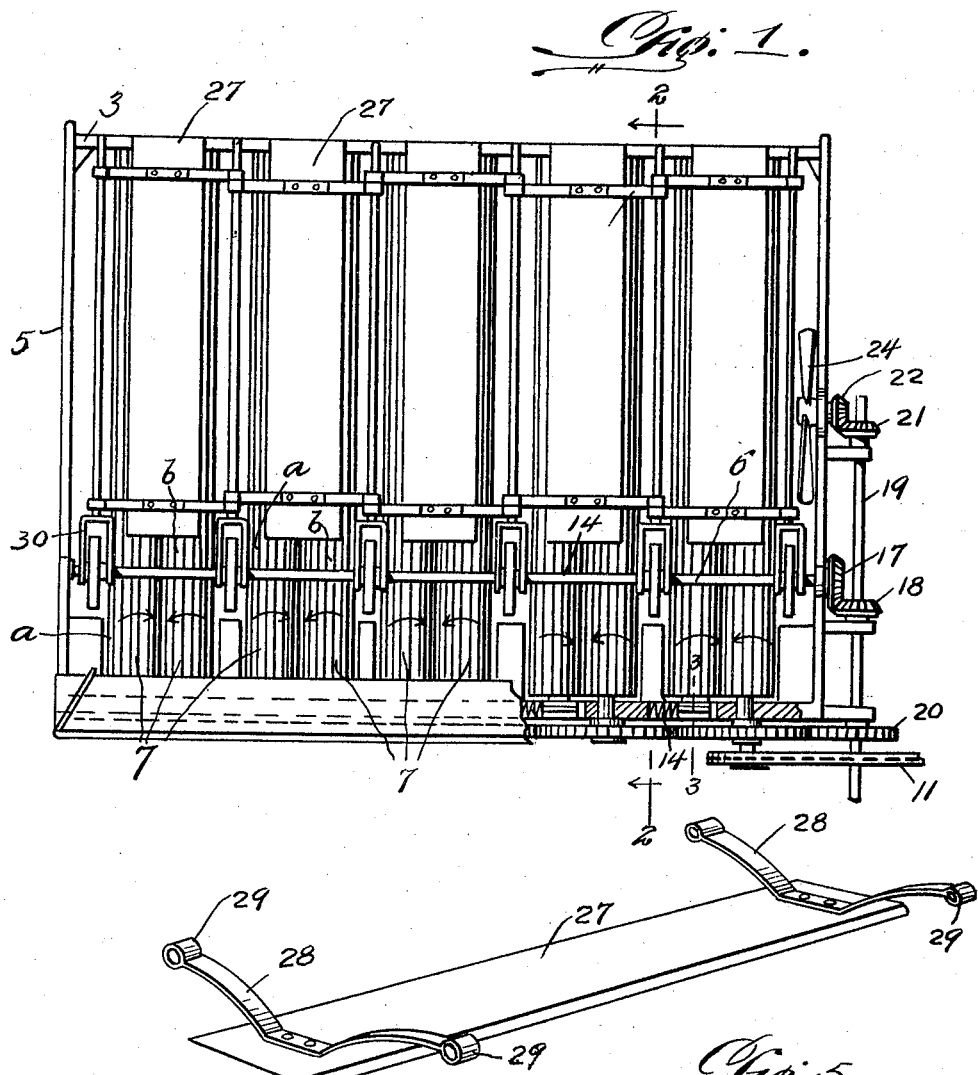

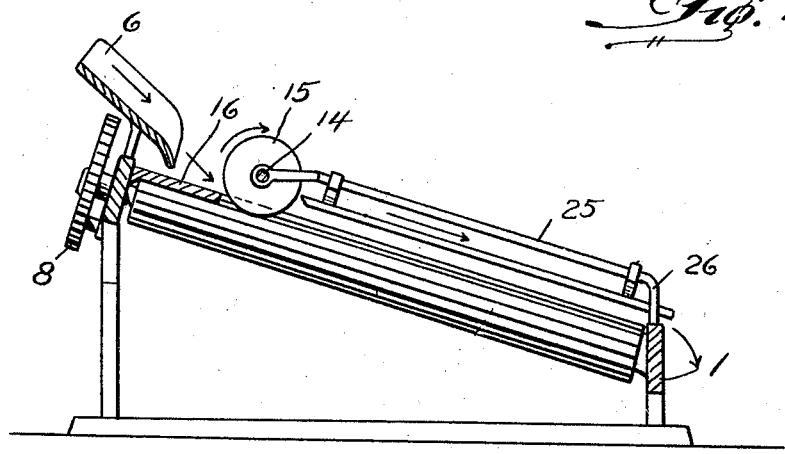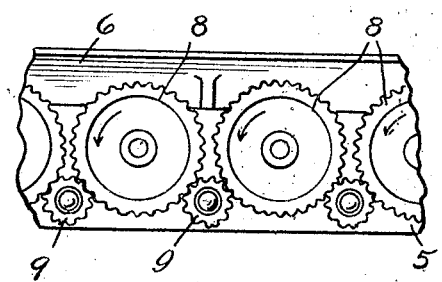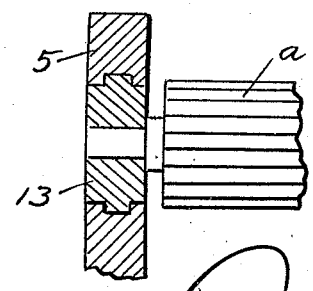

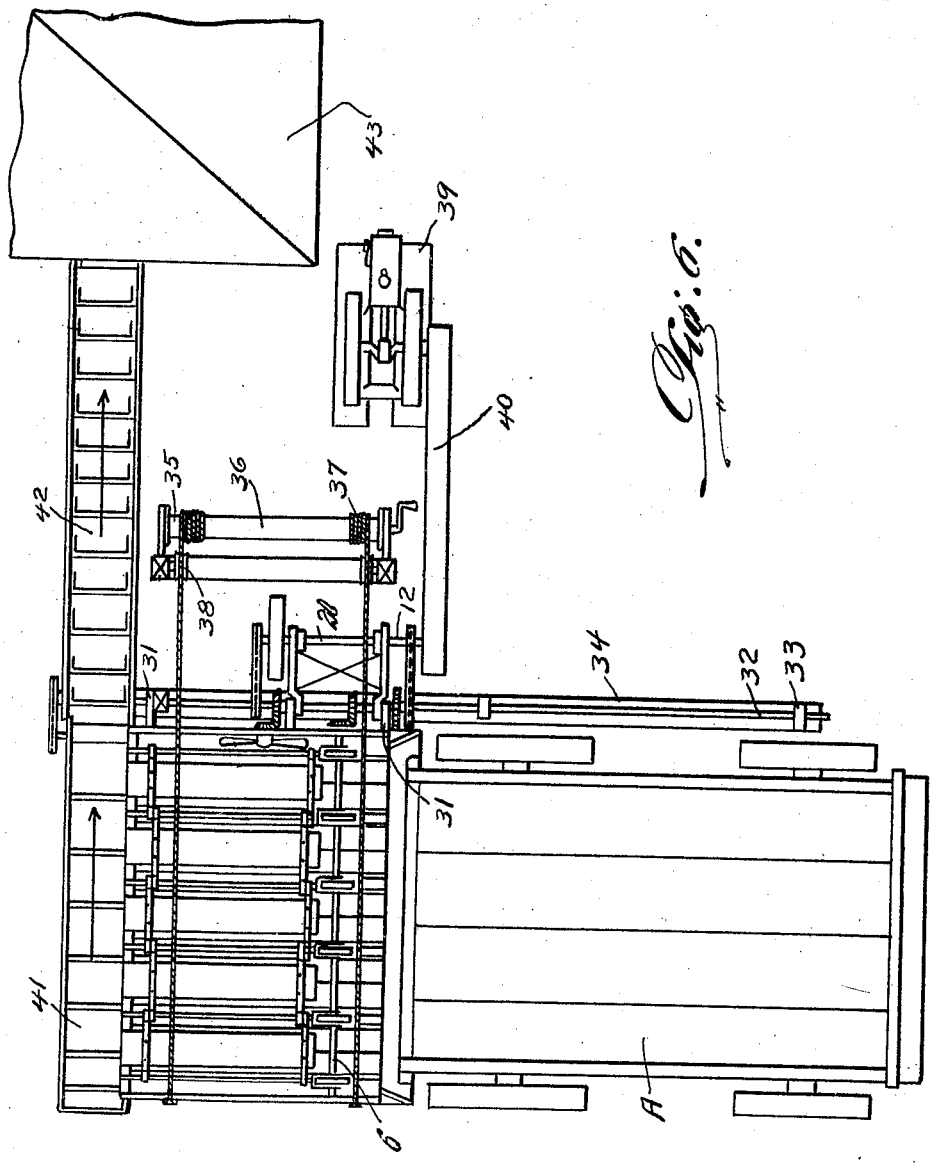

1,479,396

UNITED STATES PATENT OFFICE.

JOHN A. MEYER, OF MALCOM, IOWA.

CORN HUSKER.

Application filed April 10, 1923. Serial No. 631,131.

*To all whom it may concern:*

Be it known that JOHN A. MEYER, a citizen of the United States, residing at Malcom, in the county of Poweshiek and State of Iowa, has invented certain new and useful Improvements in Corn Huskers, of which the following is a specification.

This invention relates to improvements in corn huskers, and has for its primary object, the provision of such a machine, wherein ears of corn will be husked in a more thorough, simple and efficient manner than is now the case with huskers with which I am at present familiar.

An object of the invention resides in providing a corn husker having a plurality of pairs of husking rolls mounted in a frame in close proximity to each other, the rolls of each pair rotating in opposite directions and being adapted for thoroughly husking ears of corn, presser boards being mounted above each pair of rolls adapted for engaging the horn on said rolls and being husked by spring arms for engaging the corn and pressing it toward the rolls, the spring arms being mounted on rods carried by the frame.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1—is a top plan view, partly in cross section of the husker, per se.

Figure 2—is a detail transverse cross section of said husker.

Figure 3—is an enlarged fragmentary cross section through a portion of the husker for more adequately disclosing the sliding journal bearings for certain of the husking rolls of each of said pairs of husking rolls.

Figure 4—is a fragmentary elevation of the front end of the husker, per se.

Figure 5—is a perspective of one of the presser boards employed in conjunction with the invention, and Figure 6—is a top plan view of the husker, the corn wagon, the corn conveyor and hopper, together with the driving and elevation mechanism for the husker.

Now, having particular reference to the drawings, my husker includes generally a frame 5, that is inclined towards its front end, and is provided at its raised end with an inlet chute 6.

As more clearly shown in Figure 1, this husker includes a generally rectangular shaped frame embodying side, and front and rear bars which carry pairs of conventional type husking rolls 7 that extend in a direction transversely of the frame as per Figures 1 and 2, the rolls of each pair being designated respectively *a* and *b*.

As is now the case, each of these rolls are carried by a shaft, and in this instance, the shaft 4 of each of the rolls *b* is journaled within the front and rear bars of the frame 5, the front end of each of the shafts extending outwardly through the front frame bar and being equipped with a spur gear 8.

Referring to Figure 4, it will be seen that the spur gears of the shafts of the husking rolls *b* are spaced a slight distance from each other, the adjacent spur gears being in mesh with smaller spur gears 9, whereby motion in a similar direction is imparted to the similar husking rolls *b* of each of the pairs.

The shaft of the husking roll *b* of the innermost pair of rolls is equipped with a sprocket gear, over which is trained a sprocket chain 11, that is in turn trained over a sprocket gear upon a driven shaft 12, Figure 6, that is driven in a manner presently to be set forth.

The front and rear ends of the shafts carrying the husking rolls *a* are journaled within bearing blocks 13 that are formed upon their upper and lower ends with tongues, Figure 3, that slide within grooves within the upper and lower edges of slots within the front and rear bars of the husking frame 5, these rolls *a* being normally in close contact with the other husking rolls *b* so as to rotate in a direction opposite thereto as designated by the arrows in Figure 1, through the medium of expansion springs 14, within the slots of said front and rear spring bars.

Extending across the husking rolls adjacent the front end thereof is a horizontal shaft 14, upon which are keyed at the points outwardly of the end pairs of rolls and between adjacent pairs of rolls, corn deflecting wheels 15 that rotate in the direction of the arrow, Figure 2, and that serve as a means in conjunction with guide strips 16 between each pair of rolls for deflecting the corn from the chute 6 between the rolls $a$ and $b$ of each pair, and for consequently preventing the passage of the same between adjacent pairs of rolls or between the end pairs of rolls, and the adjacent sides of the husking frame 5. This shaft 14 carries at one end a spur gear 17 that is in mesh with a spur gear 18 upon a shaft 19, suitably journaled upon the inner side of the husking frame 5, and that is driven through the medium of a spur gear 20 upon the end of this shaft that is intermeshed with the adjacent spur gear 8 of the roller shaft $b$ of the innermost pair of husking rolls 7, as more clearly shown in Figure 1.

The opposite end of this shaft 19 is provided with a bevelled gear 21, which is in mesh with a bevelled gear 22, that is journaled in the adjacent frame bar, which stub shaft carries a blower 24 for blowing the husks, etc., off of the rollers.

Suitably supported in position above and between each pair of rollers as well as between the end rollers and frame 5 are rods 25 that extend parallel with the rollers, the rear ends thereof being down turned at 26, whereby the same are secured to the rear bar of said frame 5. Supported between adjacent rods 25 are presser boards 27, each of which carries adjacent its opposite ends spring arms 28 that are bent upwardly at their outer ends and eyed at 29, for the reception of the said rods 25, it being of course apparent that the arms 28 are spring arms and serve as a means for forcing the presser boards 27 downwardly for maintaining the ears of corn in contact with the husking rolls $a$ and $b$. The forward ends of these rods are yoked at 30 for engagement over the before mentioned guide wheels 25, the arms of the yoked ends being formed with openings for receiving the cross shaft 14.

The support for the husking frame shown in Figure 2 carries at its inner side a plurality of bracket elements 31, that are formed with alined openings for the reception of a bar 32, that is supported in standards 33 of a base board 34, Figure 6, whereby said husking frame may be swung upwardly in a manner presently to be described for allowing the corn wagon A to pass therebeneath, after which the husking frame is lowered and the front end of said wagon jacked up for discharging the corn onto the chute 6.

At one side of the husker is a hoisting device designated generally 35 that includes a cable drum 36 to which is attached certain ends of cables 37, these cables passing over elevated poles 38 and being secured at their opposite ends to the remote side of the frame, whereby when the drum of a hoisting device is rotated, the husker will be effectively swung upwardly for the purposes above set forth.

Adjacent said hoisting machine 35 is a desirable form of motor 39, the power shaft of which is equipped with a belt pulley, that is in alinement with a belt pulley upon the end of the before mentioned driven shaft 12 and trained over these belt pulleys is an endless belt 40, whereby said shaft 12 is driven for consequently actuating the husking rolls $a$ and $b$ as well as the shaft 14 and blower 24.

At the inner end of the husking frame is an endless conveyor 41 that moves in the direction of the arrow (Figure 6) and is on the lower side of the husker frame and having its outlet end in communication with an additional conveyor 42 that leads to a corn hopper 43, these conveyors being driven in a manner clearly shown in Figure 6, it being of course understood that when the husking frame is raised, the conveyor 41 will be also raised.

The operation and advantages of a machine of this character will be at once apparent to those skilled in the art, and even though I have herein set forth the most practical embodiment of the invention, it is nevertheless to be understood that minor changes may be made therein, without departing from the spirit and scope of the invention as claimed.

Having thus described my invention, what I claim as new, and desire to secure by Letters-Patent, is:

In a corn husker of the class described, a frame, pairs of husking rolls journaled within the frame, the rolls of each pair rotating in reverse directions, driving connections between certain of the rolls of each of the pairs, means for driving said certain rolls, longitudinal rods supported in an elevated position between adjacent pairs of rolls, presser boards in position above said pairs of rolls and spring arms carried by the presser boards the ends of which are eyed for receiving the longitudinal rods.

In testimony whereof I affix my signature.

JOHN A. MEYER.